United States Patent
Mizuno et al.

(10) Patent No.: US 6,935,239 B2
(45) Date of Patent: Aug. 30, 2005

(54) IMAGE FORMING SYSTEM, METHOD OF CONTROLLING THE SAME, AND PROGRAM FOR IMPLEMENTING THE METHOD

(75) Inventors: Yoshio Mizuno, Chiba (JP); Tatsuaki Hashimoto, Chiba (JP); Tsuyoshi Moriyama, Ibaraki (JP); Kenji Fukushi, Ibaraki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 10/739,896

(22) Filed: Dec. 18, 2003

(65) Prior Publication Data

US 2004/0190967 A1 Sep. 30, 2004

(30) Foreign Application Priority Data

Dec. 19, 2002 (JP) ........................... 2002-368851

(51) Int. Cl.[7] .............................. B41J 11/44
(52) U.S. Cl. .................. 101/483; 101/484; 400/61; 400/70; 400/76
(58) Field of Search ................ 101/483, 484; 400/70, 76, 61

(56) References Cited

U.S. PATENT DOCUMENTS 6,707,563 B1 * 3/2004 Barry et al. ............... 358/1.14

2004/0070788 A1 * 4/2004 Barry et al. ............... 358/1.15

FOREIGN PATENT DOCUMENTS

JP  07-319338 A  12/1995

OTHER PUBLICATIONS

Computer translation of JP 07-319338.*

* cited by examiner

Primary Examiner—Charles H. Nolan, Jr.
(74) Attorney, Agent, or Firm—Rossi, Kimms & McDowell, LLP

(57) ABSTRACT

There is provided an image forming system which is capable of performing image formation operations in an order identical or close to the order of reception of inputted print jobs even when some printers cannot output print jobs due to maintenance to thereby raise the operational efficiency. Scheduling is carried out to assign an inputted plurality of jobs to a plurality of image forming apparatuses. Respective maintenance times of the plurality of image forming apparatuses are monitored. When the result of monitoring is that the maintenance time of an image forming apparatus has been reached, scheduling is carried out to reassign unprocessed jobs out of the assigned jobs to image forming apparatuses other than the image forming apparatus for which the maintenance time has been reached. A CPU causes the other image forming apparatuses to perform image formation based on the reassigned unprocessed jobs.

15 Claims, 12 Drawing Sheets

| JOB No | CLIENT | PAGES | COPIES | PAPER | PRINTER | COMMENT |
|--------|--------|-------|--------|-------|--------------|---------|
| J001 | UserA | 40 | 100 | A4 | PRINTER 103b | |
| J002 | UserB | 120 | 300 | A4 | PRINTER 103a | |
| J003 | UserC | 140 | 150 | A4 | PRINTER 103c | |
| J004 | UserE | 30 | 200 | LTR | PRINTER 103a | 17:30 |
| J005 | UserD | 80 | 200 | A4 | PRINTER 103b | |
| J006 | UserF | 60 | 80 | A3/A4 | PRINTER 103c | |

| COMPONENT CODE | COMPONENT NAME | PRESENT COUNTER VALUE | REPLACEMENT COUNTER VALUE |
|---|---|---|---|
| C001 | REGISTRATION CLUTCH | 909851 | 1000000 |
| C001 | FIRST FEED ROLLER | 222152 | 500000 |
| C001 | SECOND FEED ROLLER | 498213 | 500000 |
| C001 | REGISTRATION ROLLER | 451223 | 500000 |
| C001 | DOUBLE-SIDED CONVEYOR CLUTCH | 101243 | 500000 |
| ⋮ | ⋮ | ⋮ | ⋮ |

# IMAGE FORMING SYSTEM, METHOD OF CONTROLLING THE SAME, AND PROGRAM FOR IMPLEMENTING THE METHOD

BACKGROUND OF THE INVENTION

1. Field of the Invention

The present invention relates to an image forming system, a method of controlling the same, and a program for implementing the method, and in particular to an image forming system in which image forming operations of a plurality of inputted jobs are executed by a plurality of image forming apparatuses, a method of controlling the same, and a program for implementing the method.

2. Description of the Related Art

Conventionally, as an image forming system in which image forming operations for a plurality of inputted jobs are carried out by a plurality of printers, an image forming system in which a plurality of printers and a plurality of computers are connected via a network is known. In such an image forming system, users can select a desired printer using printer drivers that run on the respective computers to thereby carry out printing.

An image forming system using a client-server arrangement where jobs issued by clients are outputted to printers via a server computer is also known.

Recently in the so-called "print on demand" (hereinafter, "POD") market, the printing of documents with large numbers of pages, the printing of large numbers of copies, and post-processing or the like of such large numbers of pages or copies are performed with increasing frequency. Specifically, copying contracting business is expanding, in which a copy center or the like receives copying requests from a plurality of clients and has a full-time supervisor perform copy operations. The following procedure is carried out in the copying contracting business.

When a client makes an order, the client can provide the copy center with an original to be copied by taking the original directly to the copy center, by handing over a recording medium, such as a flexible disk, on which the original is stored in the form of an electronic document, or by sending the original via a network.

When printing of large volumes of documents is performed, high-speed printers are normally used to increase efficiency. High-speed printers can be used and adjusted in a variety of ways, and it is common for maintenance and printing to be performed after a full-time supervisor has already decided the order of print jobs. In this case, clients only have to provide the full-time supervisor with the originals or print data produced by converting the originals into electronic documents. In a print shop equipped with a large number of printers, it is becoming increasingly common for a single supervisor to operate a plurality of printers.

However, there is the following problem with the conventional image forming system described above. After print jobs have been assigned to a plurality of printers (hereinafter, this process is called "scheduling"), if maintenance such as refilling with consumables or replacement of components becomes necessary for one or more of such printers, such printer(s) is/are out of operation during maintenance performed by the supervisor. Accordingly, print jobs that are assigned to printers subjected to maintenance are performed after such printers are restored to working order. This means that there have been situations where print jobs are outputted before print jobs that were issued earlier.

When such a situation occurs, if the client requires the print job to be output in a hurry, it is possible to repeat the same job using another printer. However, since the print job assigned to the printer subjected to maintenance will be outputted once the maintenance is completed, there is waste involved with producing the same print output again.

SUMMARY OF THE INVENTION

It is an object of the present invention to provide an image forming system and a method of controlling the same that are capable of performing image formation operations in an order identical or close to the order of reception of inputted print jobs even when some printers cannot output print jobs due to maintenance to thereby raise the operational efficiency, and a program for implementing the method.

To attain the above object, in a first aspect of the present invention, there is provided an image forming system comprising a plurality of image forming apparatuses, an input device that inputs a plurality of jobs, a scheduling device that carries out scheduling to assign the inputted plurality of jobs to the plurality of image forming apparatuses, an image formation control device that causes the plurality of image forming apparatuses to perform image formation based on the assigned jobs, and a monitoring device that monitors respective maintenance times of the plurality of image forming apparatuses, wherein the scheduling device is operable when a result of monitoring by the monitoring device is that the maintenance time of at least one of the image forming apparatuses has been reached, to carry out scheduling to reassign at least one unprocessed job out of the assigned jobs to at least one remaining image forming apparatus other than the at least one image forming apparatus for which the maintenance time has been reached, and the image formation control device causes the at least one remaining image forming apparatus to perform image formation based on the reassigned unprocessed at least one job.

Preferably, the image forming system further comprises a second scheduling device operable when the maintenance is completed, to carry out second scheduling to reassign unprocessed jobs out of the reassigned jobs to the plurality of image forming apparatuses including the at least one image forming apparatus for which the maintenance has been completed, and wherein the image formation control device is operable after completion of the second scheduling, to cause the plurality of image forming apparatuses to perform image formation based on the unprocessed jobs reassigned by the second scheduling.

Preferably, the scheduling device carries out the scheduling in a manner such that image forming operations of unprocessed jobs as the unprocessed at least one job are performed in an order in which the unprocessed jobs were inputted.

More preferably, the second scheduling device carries out the second scheduling in a manner such that image forming operations of the unprocessed jobs are performed in an order in which the unprocessed jobs were inputted.

Preferably, the image forming system further comprises a notifying device that notifies contents of the scheduling.

Preferably, the monitoring device monitors the maintenance times based on respective numbers of image forming operations by the plurality of image forming apparatuses.

More preferably, the number of image forming operations by the at least one image forming apparatus for which the maintenance has been completed is reset to an initial value.

Preferably, the image forming system further comprises a network, and an information processing apparatus connected to the plurality of image forming apparatuses via the network, for managing the plurality of image forming apparatuses, and wherein the information processing apparatus includes a job input device that inputs the jobs, and a job output device that outputs the inputted jobs via the network to the image forming apparatuses.

To attain the above object, in a second aspect of the present invention, there is provided a method of controlling an image forming system including a plurality of image forming apparatuses, comprising an input step of inputting a plurality of jobs, a scheduling step of carrying out scheduling to assign the inputted plurality of jobs to the plurality of image forming apparatuses, an image formation control step of causing the plurality of image forming apparatuses to perform image formation based on the assigned jobs, a monitoring step of monitoring respective maintenance times of the plurality of image forming apparatuses, wherein in the scheduling step, when a result of monitoring in the monitoring step is that the maintenance time of at least one of the image forming apparatuses has been reached, scheduling is carried out to reassign at least one unprocessed job out of the assigned jobs to at least one remaining image forming apparatus other than the at least one image forming apparatus for which the maintenance time has been reached, and in the image formation control step, the at least one remaining image forming apparatus is caused to perform image formation based on the reassigned unprocessed at least one job.

Preferably, the method of controlling an image forming system further comprises a second scheduling step of carrying out second scheduling to reassign unprocessed jobs out of the reassigned jobs to the plurality of image forming apparatuses including the at least one image forming apparatus for which the maintenance has been completed, when the maintenance is completed, and wherein in the image formation control step, after completion of the second scheduling, the plurality of image forming apparatuses are caused to perform image formation based on the unprocessed jobs reassigned by the second scheduling.

To attain the above object, in a third aspect of the present invention, there is provided a computer-readable program for causing a computer to execute a method of controlling an image forming system including a plurality of image forming apparatuses, comprising an input module for inputting a plurality of jobs, a scheduling module for carrying out scheduling to assign the inputted plurality of jobs to the plurality of image forming apparatuses, an image formation control module for causing the plurality of image forming apparatuses to perform image formation based on the assigned jobs, a monitoring module for monitoring respective maintenance times of the plurality of image forming apparatuses, wherein the scheduling module is operable when a result of monitoring by the monitoring module is that the maintenance time of at least one of the image forming apparatuses has been reached, to carry out scheduling to reassign at least one unprocessed job out of the assigned jobs to at least one remaining image forming apparatus other than the at least one image forming apparatus for which the maintenance time has been reached, and the image formation control module causes the at least one remaining image forming apparatus to perform image formation based on the reassigned unprocessed at least one job.

The above and other objects, features, and advantages of the invention will become more apparent from the following detailed description taken in conjunction with the accompanying drawings.

BRIEF DESCRIPTION OF THE DRAWINGS

FIGS. 13A to 13C are diagrams showing scheduling results for print jobs, in which FIG. 13A shows a scheduling result for the case where maintenance is yet to become necessary for any of the printers 103, FIG. 13B shows a result when rescheduling is performed, and FIG. 13C is a diagram showing a result of rescheduling at a point where maintenance is completed;

DETAILED DESCRIPTION OF THE PREFERRED EMBODIMENTS

The present invention will now be described in detail with reference to the accompanying drawings showing a preferred embodiment thereof.

Figure 1:
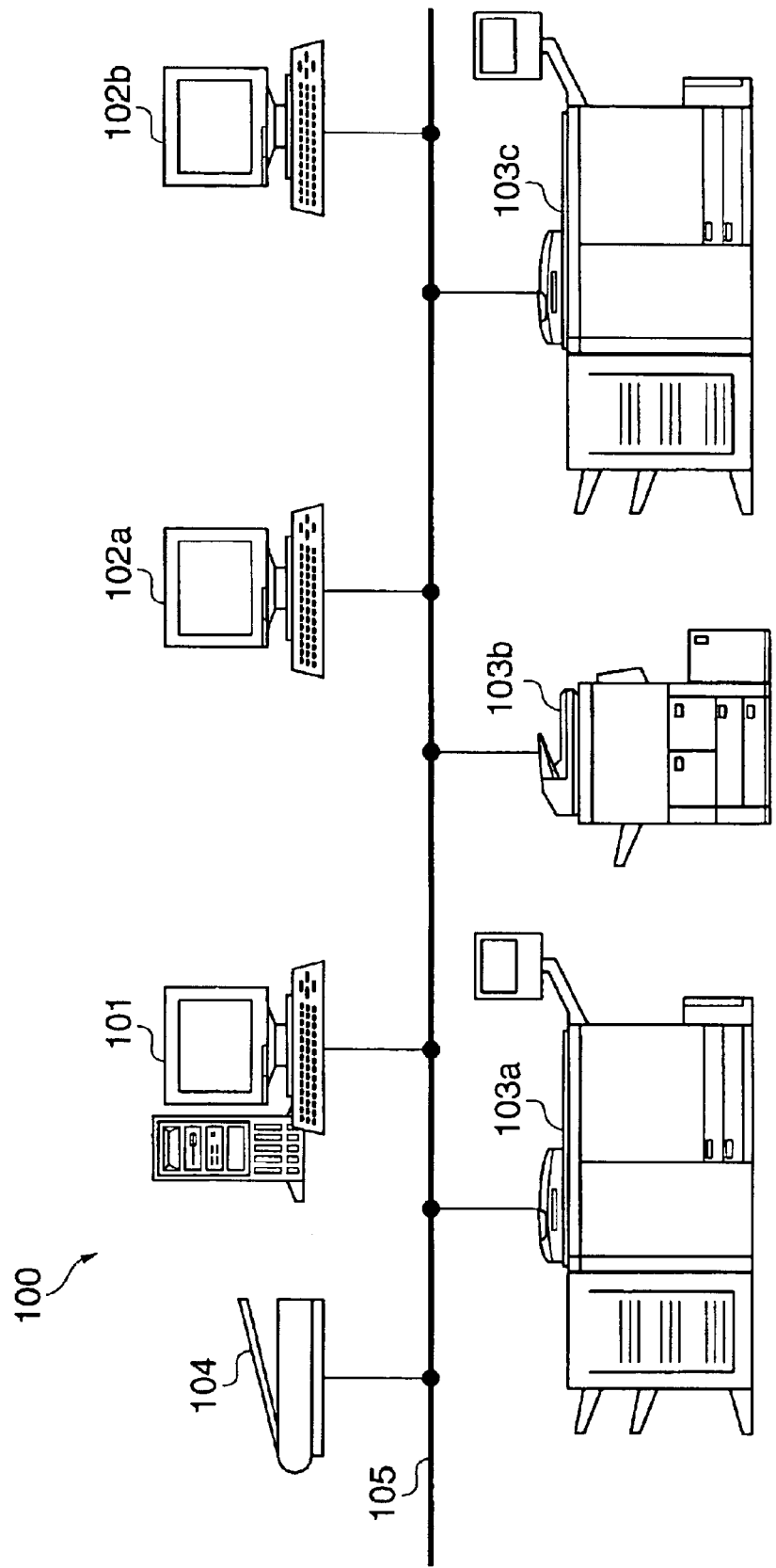
FIG. 1 is a schematic diagram showing the overall construction of an image forming system according to an embodiment of the present invention.

FIG. 1 is a schematic diagram showing the overall construction of an image forming system according to an embodiment of the present invention.

In FIG. 1, an image forming system 100 is comprised of a document server computer (hereinafter simply referred to as the "server") 101 as an information processing apparatus, client computers (hereinafter simply referred to as the "clients") 102a, 102b, image output apparatuses such as black-and-white printers 103a, 103b and a color printer 103c (hereinafter simply referred to as the "printers 103"), and an image input apparatus such as a scanner 104. The server 101, the clients 102a, 102b, and the image input apparatus and image output apparatuses are connected by a network 105 so as to be able to exchange data with one another.

The clients 102a, 102b send jobs to the server 101. The users that operate the clients 102a, 102b may be supervisors of a POD center or the like where many image output apparatuses are installed, or may be typical users. In the example described here, the client 102a is treated as a computer used by a supervisor. The supervisor referred to here is someone who supplies sheets to the printers 103 and has the knowledge required to perform maintenance such as adjustment of print density, and is not someone in charge of repairing a printer that has broken down completely. Depending on the scale of the image forming system, there are cases where there are a plurality of supervisors. Hereinafter, a group of all of the printers 103a, 103b, and 103c included in the image forming system will be referred to as the printers 103. Also, a plurality of clients may be connected in addition to the clients 102a, 102b, and all clients in the image forming system will be referred to as the clients 102.

On the other hand, the server 101 stores and manages job data for jobs, which have been received from the clients 102 and for which images are to be formed on sheets by the printers 103, so that the job data for respective jobs can be identified. Although only three printers are shown in FIG. 1, a larger number of printers can be connected as the printers 103. Here, the server 101 and the clients 102 are respectively implemented by typical PCs comprised of a display apparatus and a computer main body equipped with a CPU, ROM, RAM, NIC, and the like, which are well known. The respective computer main bodies are also each internally equipped with a large-capacity writable storage device. It should be noted that the server 101 and the clients 102 are not limited to PCs, and may be image forming apparatuses that also function as the server 101 and/or the clients 102, for example.

The scanner 104 is an image input apparatus that reads an image of an original, and can transmit the read image via the network 105 to the server 101.

Application software that performs so-called DTP (Desktop Publishing) runs on the clients 102 so that various kinds of documents and images can be created and edited. The clients 102 convert the generated documents and images into page description language (PDL) and print the documents and images using the printers 103 via the network 105.

The printers 103 respectively include communication means that can exchange information with the server 101 via the network 105 and are configured so that information on the printers 103 and conditions of the printers 103 are sequentially provided to the server 101 and/or to the clients 102 via the server 101. The server 101 and/or the clients 102 has/have utility software that receives such information and performs operations, so that the printers 103 are managed by the server 101 and/or the clients 102.

Next, the construction of the printers 103 will be described. The printers 103a, 103b differ from the printer 103c in that the former output black-and-white images and the latter outputs full-color images, and since many apparatuses that output full-color images are also able to output black-and-white images, the printers 103 will be described by focusing on the printer 103c that outputs full-color images, with the functions of the printers 103a, 103b that always output black-and-white images being additionally described as necessary.

Figure 2:
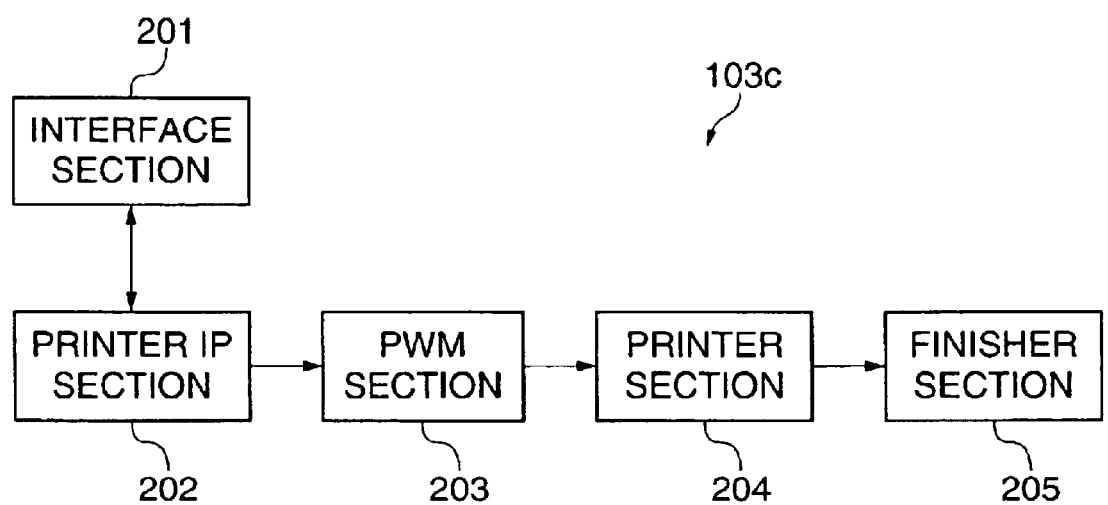
FIG. 2 is a block diagram showing the electrical configuration of a printer 103c when processing data sent via a network 105 appearing in FIG. 1

FIG. 2 is a block diagram showing the electrical configuration of the printer 103c when processing data sent via the network 105. The printer 103c is comprised of an interface section 201, a printer IP section 202, a PWM section 203, a printer section 204, and a finisher section 205. Data sent from the network 105 is inputted via the interface section 201, is processed by the printer IP section 202 and the PWM section 203, and is printed onto recording sheets by the printer section 204. The recording sheets printed by the printer section 204 are conveyed to the finisher section 205 where a sheet sorting process and a sheet finishing process are executed.

The printer IP section 202 decomposes image data into four colors, yellow (Y), magenta (M), cyan (C), and black (K), corrects the data, and then sends the resulting data to the PWM section 203. The image data for the four colors are delivered to the PWM section 203 to be converted into data suited to image formation for the four colors. The data converted by the PWM section 203 are sent to a laser driving section, not shown, wherein respective lasers for the four colors CMYK emit laser beams. The laser beams emitted from the respective lasers are scanned by a polygon mirror 913 to be irradiated onto photosensitive drums 917, 921, 925, and 929 respectively (see FIG. 3).

Figure 3:
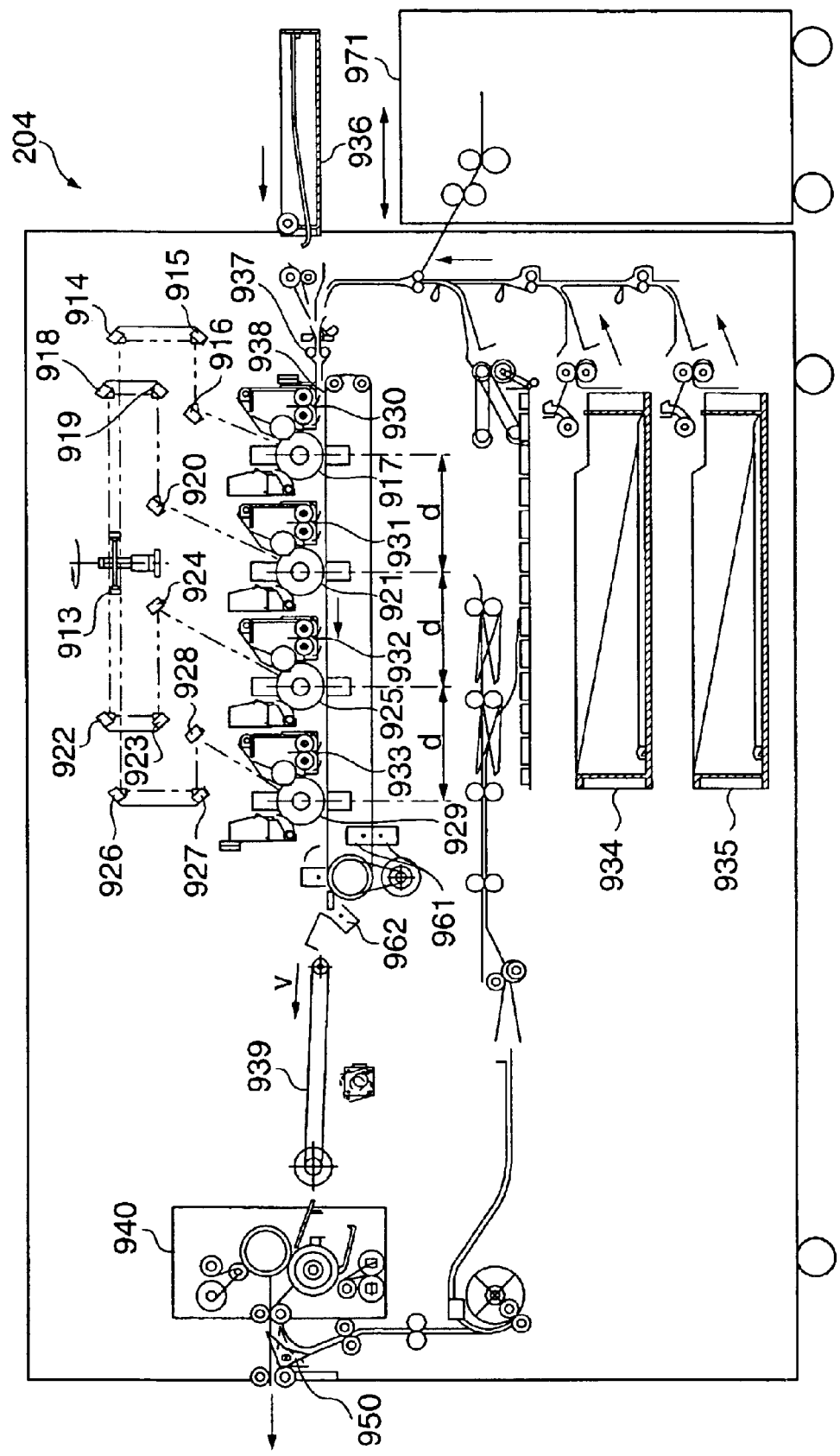
FIG. 3 is a diagram showing the internal construction of a printer section 204 appearing in FIG. 2.

FIG. 3 is a diagram showing the internal construction of the printer section 204 in FIG. 2. In FIG. 3, reference numeral 913 designates the polygon mirror mentioned above. When the four laser beams emitted from the four semiconductor lasers, not shown, are incident on the polygon mirror 913, one laser is deflected by mirrors 914, 915, and 916 to scan the photosensitive drum 917, another laser is deflected by mirrors 918, 919, and 920 to scan the photosensitive drum 921, another laser is deflected by mirrors 922, 923, and 924 to scan the photosensitive drum 925, and another laser is deflected by mirrors 926, 927, and 928 to scan the photosensitive drum 929.

On the other hand, reference numeral 930 designates a developer that supplies yellow (Y) toner to develop a latent image formed on the photosensitive drum 917 by the laser beam to thereby form a yellow toner image. Reference numeral 931 designates a developer that supplies magenta (M) toner to develop a latent image formed on the photosensitive drum 921 by the laser beam to thereby form a magenta toner image. Reference numeral 932 designates a developer that supplies cyan (C) toner to develop a latent image formed on the photosensitive drum 925 by the laser beam to thereby form a cyan toner image. Reference numeral 933 designates a developing device that supplies black (K) toner to develop a latent image formed on the photosensitive drum 929 by the laser beam to thereby form a black toner image. The toner images of the four colors (Y, M, C, and K) are transferred onto a recording sheet to obtain a full-color output image.

A recording sheet supplied from one of sheet feed cassettes 934 and 935 is conveyed via a registration roller 937 and is attached to a transfer belt 938 to be further conveyed. In synchronization with the timing of sheet feeding, toner images of the respective colors are formed via development on the photosensitive drums 917, 921, 925, and 929 in advance as described above, and the toner images of the respective colors are transferred onto the recording sheet as the recording sheet is conveyed. The recording sheet onto which the toner images have been transferred is separated from the transfer belt 938, is conveyed by a conveying belt 939, and the toner images are fixed onto the recording sheet by a fixing device 940.

The recording sheet that has passed the fixing device 940 is first guided downwards by a flapper 950 and after a trailing edge of the recording sheet has passed the flapper 950, the recording sheet is switched back and discharged. As a result, the recording sheet is discharged face down, and when printing is performed in order starting from a first page, the printed recording sheets are stacked in the correct page order. It should be noted that the four photosensitive drums 917, 921, 925, and 929 are disposed at equal intervals of a distance d, the recording sheet is conveyed at a constant velocity v by the conveying belt 939, and the four semiconductor lasers, not shown, are driven in timing synchronous with the conveying of the recording sheet.

As sheet feed cassettes, the recording sheet cassettes 934, 935 mentioned above are provided as standard and a large-capacity side deck 971 can be attached as an option. In the present embodiment, side decks are attached to the printers 103a, 103b, but no side deck is attached to the printer 103c. A cassette used for feeding a sheet can be selected automatically or manually via a printer driver. Also, some printers may have an "auto cassette change" function of automatically switching to another sheet feed cassette that stores recording a sheet of the size when a sheet feed cassette becomes empty during printing. It is also possible to attach a multi-tray 936 that feeds special recording sheets, such as OHP sheets or sheets of a small size.

Figure 4:
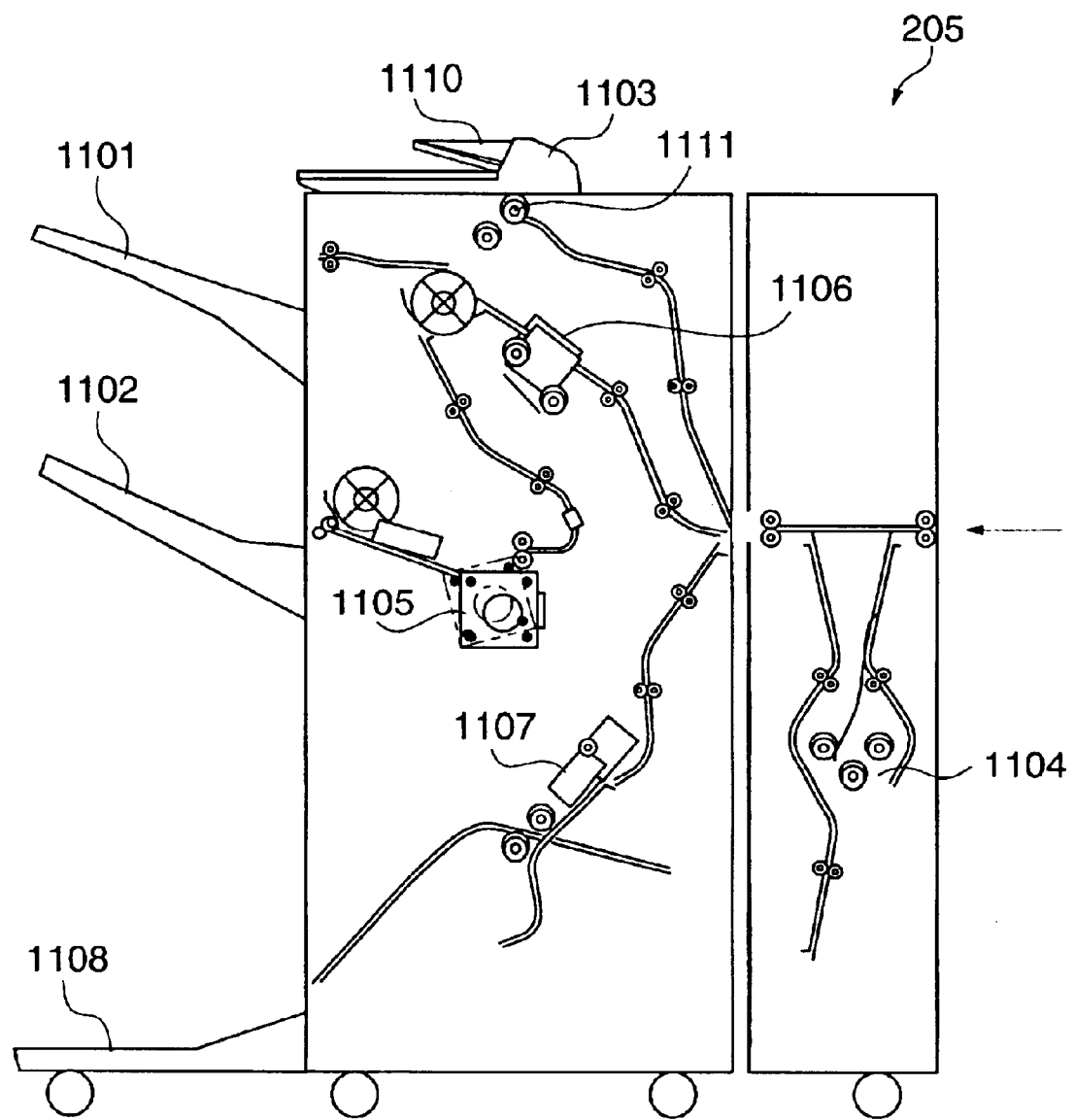
FIG. 4 is a diagram showing the internal construction of a finisher section 205 appearing in FIG. 1.

FIG. 4 is a diagram showing the internal construction of the finisher section 205. Sheets that have exited the fixing device 940 of the printer 103c enter the finisher section 205. The finisher section 205 is provided with a sample tray 1101 and a stacker tray 1102, and switches between the sample tray 1101 and the stacker tray 1102 according to the type of job and number of recording sheets to be discharged.

Sorting supported by the finisher section 205 can be performed according to two methods, that is, a bin sorting method in which a plurality of bins are disposed at fixed positions and recording sheets are sorted into the respective bins, and a shift sorting method in which recording sheets outputted for different jobs are sorted into bins or trays while the bins or trays are shifted in sideward directions. When a core section, not shown, is provided with a large capacity memory, the finisher section 205 also supports an electronic sorting function called "collating" that changes the page order and discharge order of pages that have been buffered in the memory.

A grouping function sorts recording sheets into pages as is distinct from the sorting function that sorts the recording sheets into jobs. In the case when recording sheets are discharged to the stacker tray 1102, before the recording sheets are discharged, the sheets may be stacked for separate jobs and then stapled by a stapler 1105 immediately before being discharged.

A Z-folding device 1104 for Z-folding sheets and a puncher 1106 for punching holes for filing are also provided on a conveying path before sheets reach the two trays described above. Such processes may be performed depending on the type of job. A saddle stitcher 1107 performs a process that binds recording sheets at two places in a central part thereof and then folds the sheets in half by making a roller engage the central part of the sheets, thereby producing a magazine or a booklet such as a pamphlet. Recording sheets that have been bound by the saddle stitcher 1107 are discharged to a booklet tray 1108. In addition, it is also possible to bind sheets using glue or to use a trimmer (cutter) for aligning ends of sheets on the opposite side to the bound side after the sheets have been bound.

Figures 5, 6:
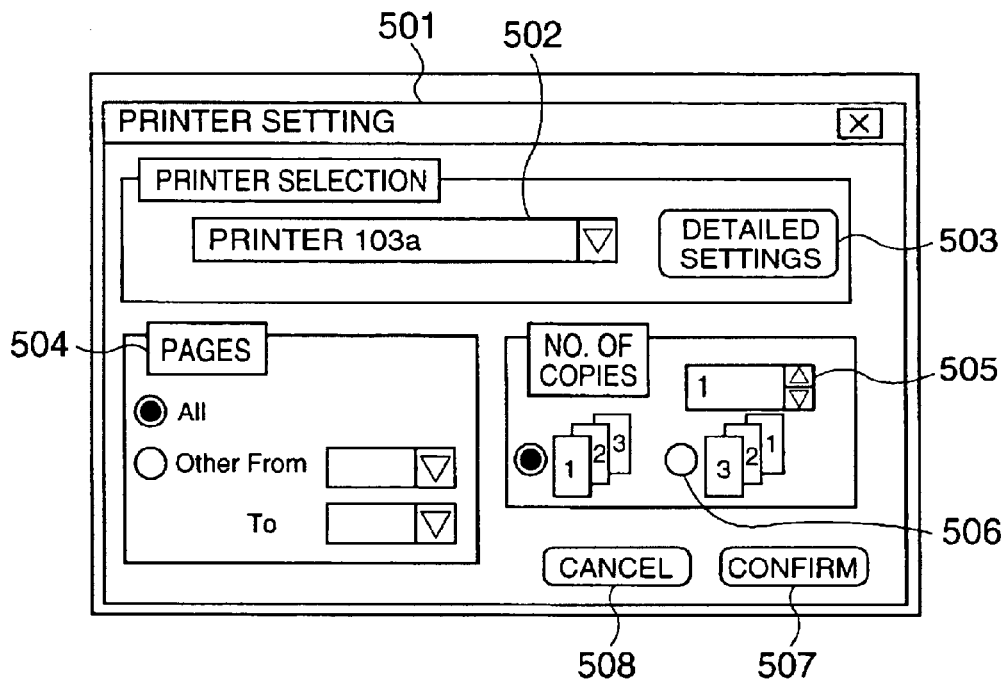
FIG. 5 is a view showing a job setting screen displayed by clients 102.
FIG. 6 is a diagram showing the job list generated by a server 101.

FIG. 5 is a view showing a job setting screen displayed by the clients 102. The printer driver is a GUI for giving instructions for a print operation. It is possible for the user of the client 102 to designate setting parameters on the GUI to send a desired image to the printers 103. In FIG. 5, reference numeral 501 designates a window screen of the printer driver. As one of setting items that can be made in the window screen, reference numeral 502 designates a transmission destination selection column in which the target output destination is selected. In the present embodiment, the output destination is one of the printers 103, but the output destination may be an image output apparatus and is not limited to the printers 103.

Reference numeral 504 designates a page setting column in which the output pages are selected from pages in a job. With this column, it is determined which pages of the job are to be outputted, that is, which images are to be sent from the client 102. Reference numeral 505 designates a number-of-copies setting column in which the number of copies is designated. Reference numeral 506 designates sort selection buttons that select the sorting order.

Reference numeral 503 designates a property key for making detailed settings relating to the transmission destination device selected in the transmission destination selection column 502. When this property key is clicked, another screen is displayed so that setting information unique to the selected device can be inputted, to enable special image processing to be performed. As one example, by changing parameters inside the printer IP section 202, it is possible to perform more detailed color reproduction or to adjust sharpness, to make settings, such as stapling settings, for a post-processing apparatus, and to enter other special information such as an output time. Once desired settings have been made, printing is commenced by clicking a confirm key 507. Alternatively, printing is canceled by clicking a cancel key 508.

When image data is captured by the image input apparatus 104 and printed by the printers 103, the same kind of scanner driver is displayed on a screen of the image input apparatus 104 or the clients 102 and settings are made, so that the captured image data is sent to the server 101. Based on the image data and setting information sent from the clients 102 or the image input apparatus 104, the server 101 generates a job list for the printers 103.

FIG. 6 is a diagram showing the job list generated by the server 101. In FIG. 6, reference numeral 601 designates a column including job numbers that are assigned to respective jobs by the server 101. Reference numeral 602 designates a column including client numbers of clients that made image output requests. Reference numeral 603 designates a column including numbers of pages. Reference numeral 604 designates a column including numbers of copies. Reference numeral 605 designates a column including paper sizes. Reference numeral 606 designates a column including printer numbers. Reference numeral 607 designates a column including other special information inputted by a supervisor, such as a time of reception.

The server 101 arranges the jobs for the printers 103 into the order in which the jobs were received and sends the jobs one by one to the printers 103 starting from the first job. The printers 103 start printing when jobs are received.

Figure 7:
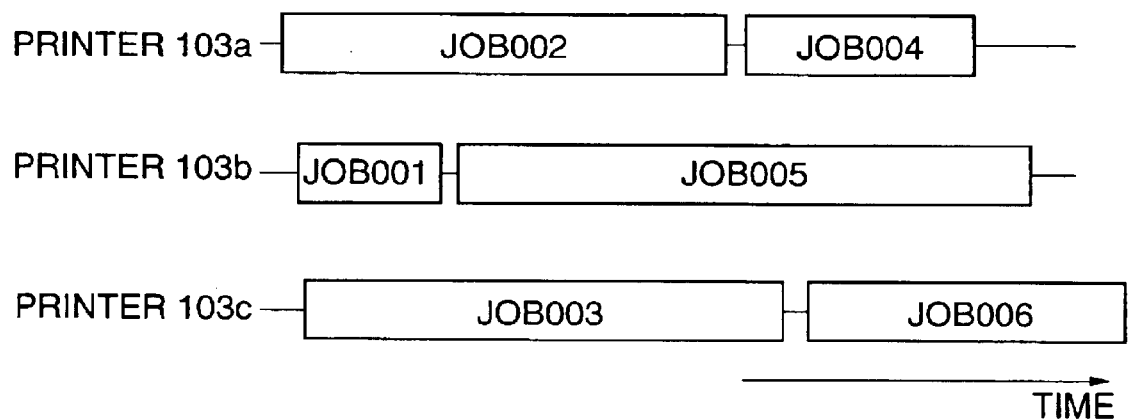
FIG. 7 is a diagram showing a scheduling result for jobs set by one of the clients 102 as a time series.

FIG. 7 is a diagram showing a scheduling result for jobs set by the client 102 as a time series. As a result of the server 101 scheduling the print jobs, jobs 002 and 004 are set in that order for the printer 103a. Jobs 001 and 005 are set in that order for the printer 103b, and jobs 003 and 006 are set in that order for the printer 103c.

Figure 8:
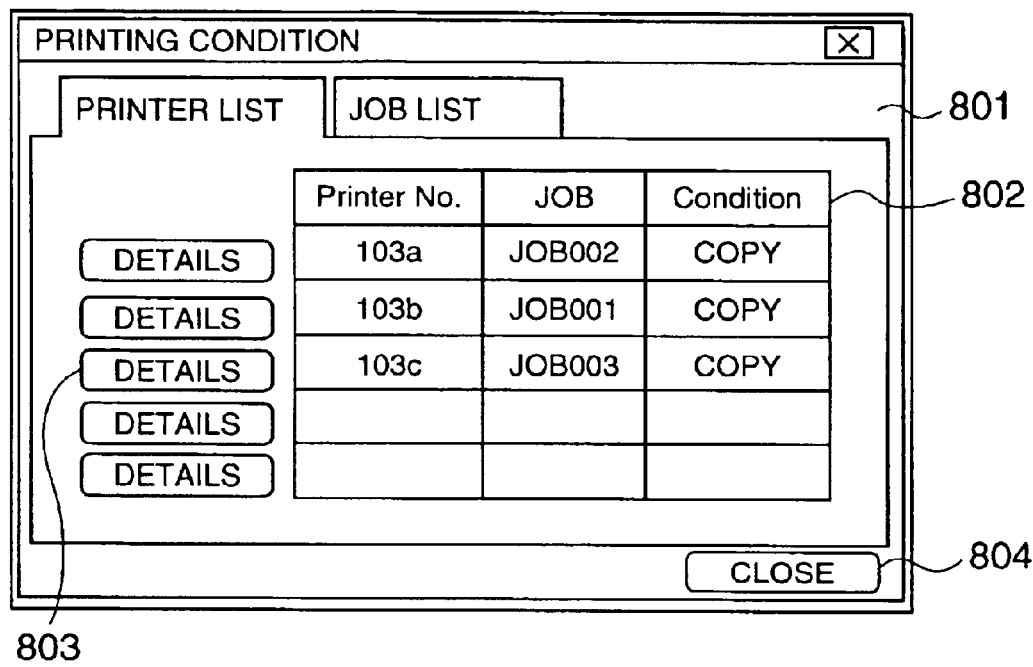
FIG. 8 is a view showing a confirmation screen for printers 103.

The conditions of the printers 103 can be confirmed on the screen of the client 102a. FIG. 8 is a view showing a confirmation screen for the printers 103. In FIG. 8, reference numeral 801 designates a printer list window screen showing a list of printer conditions. Reference numeral 802 is a condition column in which a present condition is displayed for each of the printers 103. For example, the screen shows that the job 002 is presently being printed by the printer 103a. Reference numeral 803 designates "details" buttons, and by pressing one of the "details" buttons 803, it is possible to view the details of one of the printers 103. For example, when the "details" button 803 corresponding to the printer 103a is pressed, a printer details window screen is opened.

Figure 9:
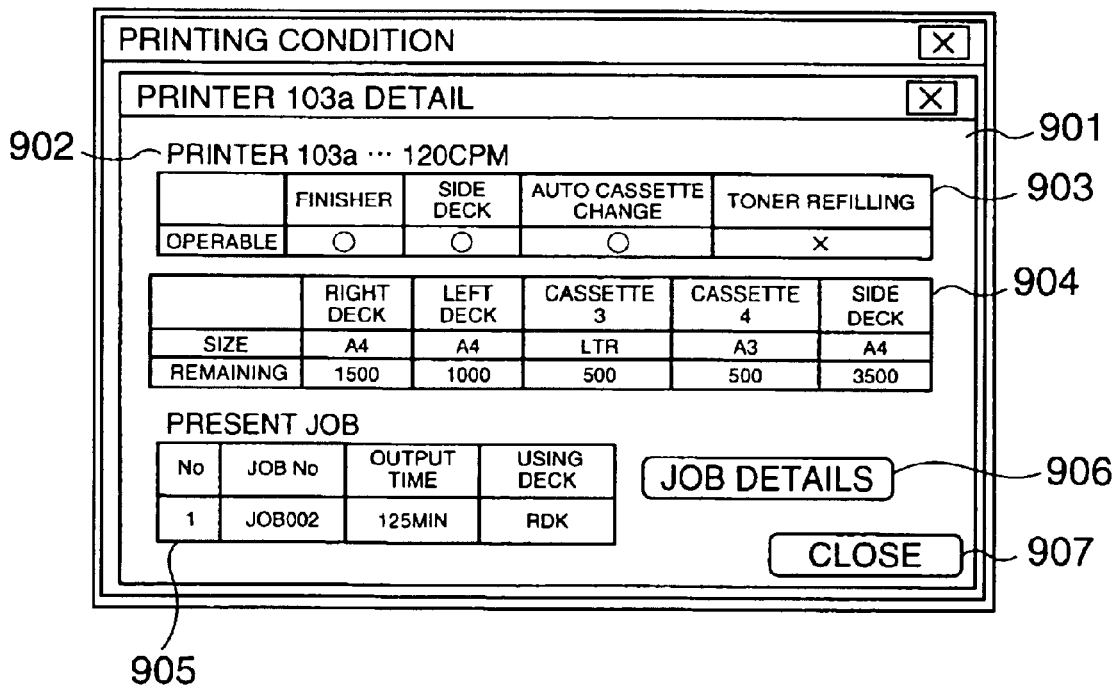
FIG. 9 is a view showing a printer details window screen.

FIG. 9 is a view showing the printer details window screen. In FIG. 9, reference numeral 901 designates a details window screen. Reference numeral 902 designates a printer information column in which printer information such as a printer name and a CPM (copies per minute) value is displayed. Reference numeral 903 designates a printer specification column in which the presence of options (such as a side deck and a finisher) and special features (for example, an auto cassette changing mechanism and toner refilling during printing) are displayed. Reference numeral 904 designates a recording sheet column in which the size and remaining amount of recording sheets in stock are displayed. In the present embodiment, a numerical value is displayed as the remaining amount of recording sheets, though a display of "high", "medium", or "low" or the like is also possible. Reference numeral 905 designates a job column in which the job presently being carried out is displayed. Reference numeral 906 designates a job details button. Reference numeral 907 designates a close button, and when the supervisor presses this close button 907, the details window screen 901 is closed and the display returns to the original printer list window screen 801.

Figures 10, 11:
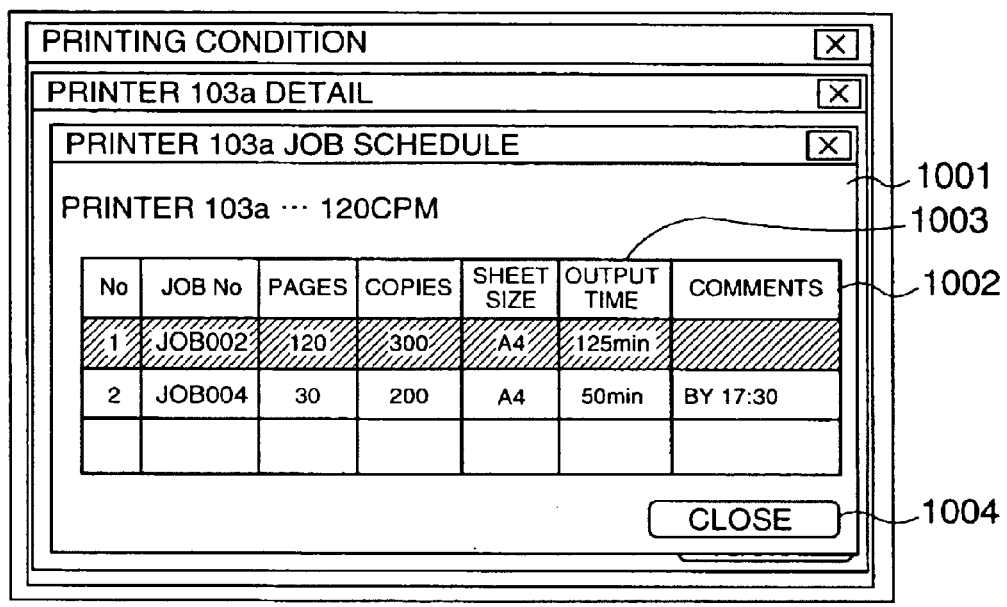
FIG. 10 is a view showing a job details window screen.
FIG. 11 is a diagram showing a component replacement table that corresponds to the printer 103a before a print job is received.

When the job details button 906 in the details window screen 901 is pressed, the job details window screen is opened. FIG. 10 is a view showing the job details window screen. In the job details window screen 1001, a job schedule 1002 is displayed for one of the printers 103. In the job schedule 1002, output times 1003 and the like of jobs are displayed. When the supervisor presses a close button 1004, the job details window screen 1001 is closed and the display returns to the details window screen 901.

As shown in FIG. 10, the server 101 assigns print jobs and, based on the functions and number of copies per minute of the respective printers 103, calculates the time required to complete the print output of the respective print jobs. The result of the calculation is displayed in the output time column 1003. Based on the output times, the server 101 calculates the time required until the presently scheduled print jobs are completed for the respective printers 103, and stores such completion times.

Next, based on the completion times of the respective printers 103, the server 101 performs scheduling so that newly received print jobs are assigned in the order of reception starting from the printer 103 with the earliest completion time. As a result, print output is performed starting with the print job that was received first.

The server 101 stores a component replacement table shown in FIG. 11 separately in advance for the respective printers 103. Values in the component replacement table for a printer are updated whenever that printer operates. FIG. 11 is a diagram showing a component replacement table that corresponds to the printer 103a before a print job is received. The component replacement table includes data for component codes 1101, component names 1102, a present counter value 1103, and a replacement counter value 1104.

When the server 101 receives a print job from the client 102, the server 101 calculates a number of operations for image formation required for the print job. In addition, the server 101 selects a sheet feeder according to the recording sheet size and changes the sheet path according to whether an image forming mode is "single-sided" or "double-sided". For example, when the image forming mode is "single-sided", the number of operations for the registration roller and registration clutch is the number of sheets multiplied by one, while when the image forming mode is "double-sided", the number of operations is the number of sheets multiplied by two.

The server 101 adds the number of operations found from the print job to the present counter values for respective components and judges whether any of the addition results exceeds the corresponding replacement counter value 1104. For example, when 3,000 operations are required by a print job and recording sheets are to be fed from the second sheet feed cassette, the result for the "second feed roller" is 498,213+3,000=501,213>500,000 so that the addition result exceeds the replacement counter value.

When the replacement counter value is determined to have been exceeded, this means that if the present print job is received, the printer 103a will go beyond a replacement time indicating that maintenance is required, so that the server 101 inhibits the printer 103a from receiving subsequent print jobs, after the completion of the present print job. At the same time, the server 101 transmits a message, which shows that the replacement time of the second feed roller of the printer 103a will be reached by printing the print job presently being received, to the client 102a operated by the supervisor, so that a request for replacement of the second feed roller and an indication of the printer 103a being out of operation are displayed, which urge the supervisor to perform maintenance on the printer 103a.

At this time, by informing the supervisor who uses the client 102a or the users of other clients 102 of the need to perform maintenance on the printer 103a and of the estimated time period required to complete the maintenance, it is possible for the supervisor who uses the client 102a and the users of other clients 102 to know that print output by the printer 103a is possible only up to the print job presently being carried out.

If the printer 103a receives a maintenance request from the server 101 via the network 105 when the print job has been received and printing has started, the printer 103a invalidates a printer ready signal generated inside the printer 103a so that print outputs cannot be carried out after the present print job is completed. In the present embodiment, after the present print job has been carried out, the printer 103a invalidates the printer ready signal and informs the server 101 via the network 105 that print jobs cannot be received or carried out. At an "H" level, the printer ready signal shows that print jobs can be carried out, while at an "L" level, it shows that print jobs cannot be carried out. Until an operation, described later, that sets the printer ready signal to the "H" level is carried out, the printer ready signal is kept at the "L" level. The server 101 receives the printer ready signals for the respective printers 103 via the network 105 to monitor the conditions of the respective printers 103, to thereby detect that the printer 103a, out of the printers 103, is out of operation.

Figure 12:
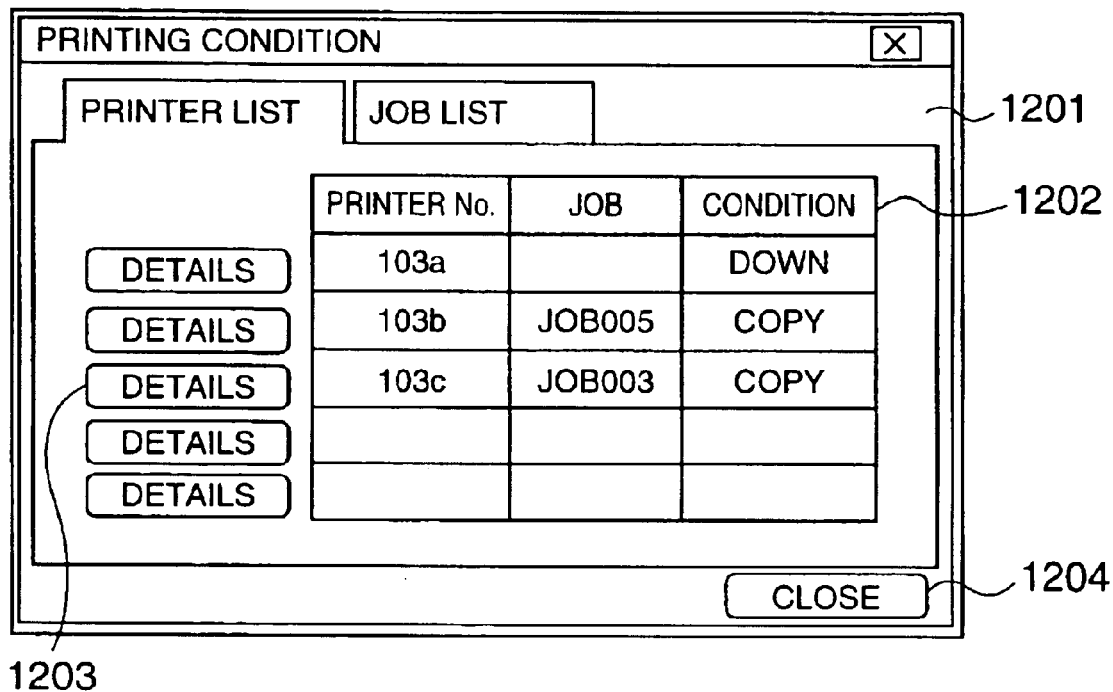
FIG. 12 is a view showing a printer confirmation screen when the printer 103a has completed a job JOB002.

FIG. 12 is a view showing a printer confirmation screen when the printer 103a has completed the job JOB002. Due to the maintenance request from the server 101, the printer 103a is in a condition where maintenance must be carried out by the supervisor and accordingly the printer 103a outputs the printer ready signal at the "L" level. As a result, "DOWN" meaning that the printer has ceased operating, is displayed in a condition column 1202 of the printer 103a. Thus, the supervisor and the user of the clients 102 can know that the printer 103a is incapable of copying, that is, the printer 103a is out of operation. Since print jobs cannot be received, the job column for the printer 103a is empty.

When the condition of the printer 103a becomes "under maintenance" where print output is not possible, the server 101 collects every unprocessed job for the printers 103. The server 101 reschedules the collected jobs so that the printers 103 other than the printer 103a that are able to carry out print outputs (that is, the printers 103b and 103c) output the jobs in the order in which the unprocessed jobs were received (inputted).

When the maintenance is completed, the supervisor needs to carry out the following procedure to restore the printer 103a. The supervisor turns on the power of the printer 103a after maintenance is completed. The printer 103a refers to the printer ready signal and performs normal startup control if the level is "H". In the present case, however, the printer ready signal stays at "L" even when the power is turned on from an off state, so that startup control is instead performed as follows. First, when the power is turned on, the printer 103a outputs a sample image and performs a self-diagnosis. The supervisor checks the outputted sample image. When it has been determined in both the self-diagnosis by the printer 103a and the check by the supervisor that image formation preparations have been completed properly, the supervisor presses a maintenance completion button provided on the printer 103a to inform the server 101 that the maintenance has been completed. This startup control performed after the maintenance is the same as that performed by the other printers 103 (that is, the printers 103b and 103c).

When the maintenance completion button has been pressed, the printer 103a can change the printer ready signal from the "L" level to the "H" level. After this, the change in the printer ready signal is transmitted via the network 105 to the server 101. Then, the server 101 changes the printer condition of the printer 103a from the "DOWN" condition to the "READY" condition. After this, to assign print jobs to the printer 103a that has been restored, the server 101 collects all of the unprocessed jobs at that time from the other printers 103 (that is, the printers 103b and 103c) and reschedules the jobs for the printers 103 including the printer 103a.

Figure 13:
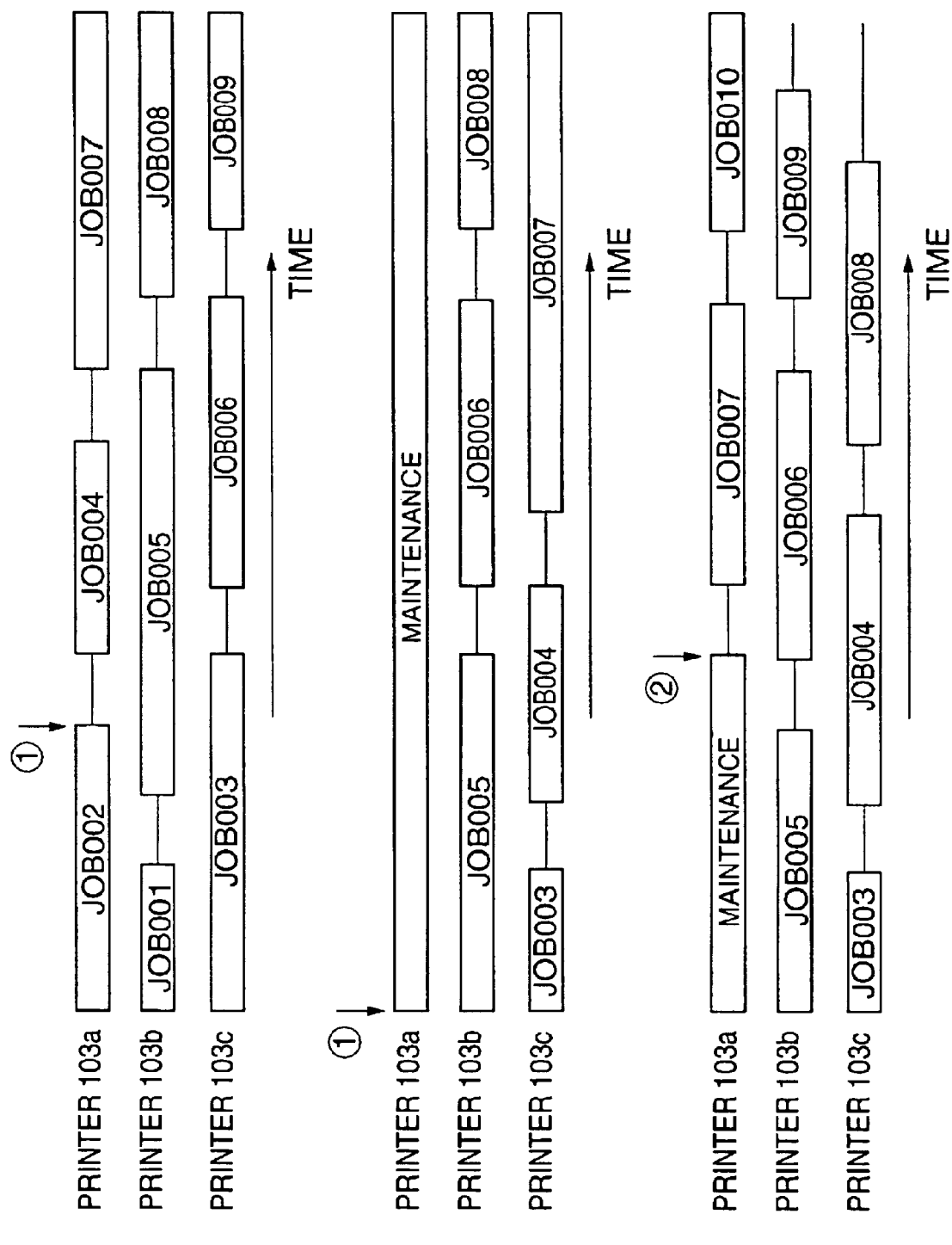

A description will be now given of the scheduling performed by the server 101 from a time point when maintenance becomes necessary to a time point where the maintenance is completed. FIGS. 13A to 13C are diagrams showing scheduling results for print jobs. FIG. 13A shows a scheduling result for the case where maintenance is yet to become necessary for any of the printers 103.

According to an original schedule for the printer 103a, the job JOB004 is to be carried out after the job JOB002 is completed. But, as described earlier, the server 101 detects that the counter value of the second feed roller will exceed the replacement counter value when the job JOB002 is completed. When the job JOB002 is completed after the printer 103a receives the job JOB002, that is, at a time point indicated by the arrow (1) in FIG. 13A, the printer 103a becomes "under maintenance". This means that the schedule of print jobs for the printers 103 is first cleared, and rescheduling is performed so that unprocessed print jobs which were initially scheduled are carried out by the printers 103 other than the printer 103a (that is, the printers 103b and 103c) in the order in which the jobs were received. The "unprocessed print job" means the print job which has not been initiated.

FIG. 13B shows the result of the rescheduling. As described above, the server 101 informs the supervisor in advance (in the present embodiment, at the start of the job JOB002) that maintenance for replacing the second feed roller will be required when the job JOB002 is completed and also displays a message to that effect. The supervisor commences the maintenance work when the job JOB002 is completed. The supervisor has been informed by the server 101 of what component of what device is to be replaced, so that the supervisor can investigate in advance what kind of work procedure is required. The supervisor can also investigate in advance whether the replacement part is in stock. In this way, the supervisor can find out about the maintenance work in advance, so that any prior preparations can be carried out efficiently.

Until the maintenance is completed, print jobs cannot be received by the printer 103a. At a time point indicated by the arrow (1) in FIG. 13B, the server 101 is informed via the network 105 that the printer 103b is carrying out the job JOB005 and the printer 103c is still carrying out the JOB003. Since the print jobs being carried out cannot be changed, the server 101 reschedules the printer jobs that are yet to be carried out in the input order following the completion of the present print jobs, that is, the server 101 assigns the unprocessed jobs JOB004, JOB006, JOB007, JOB008, and JOB009 in that order. In other words, the server 101 performs scheduling as shown in FIG. 13B so as to assign the unprocessed job JOB004 that was received first to the printer 103c and then the job JOB006 to the printer 103b.

In this way, the server 101 detects that the replacement time will be reached when the printer 103a receives the job JOB002, and performs rescheduling for the print jobs that have already been scheduled so as to assign the unprocessed jobs to the other printers 103 (the printers 103b and 103c) that can carry out printing.

It is clear from the preceding explanation that also when the job JOB002 is assigned to the printer 103a, the server 101 can detect that the maintenance time for the second feed roller of the printer 103a will be reached, so that the same control procedure can be used even if rescheduling is performed at the time point when the job JOB002 is assigned to the printer 103a. This makes it possible to inform the supervisor sooner that maintenance, i.e., replacing the second feed roller of the printer 103a, will be required.

After the maintenance work for replacing the second feed roller has been completed by the supervisor, the procedure described above is carried to indicate that the maintenance has been completed and the printer 103a can be used, and when on detecting this indication from the printer 103a via the network 105, the server 101 resets the counter value 1103 of the replaced component, i.e., the second feed roller, to an initial value of zero, and once again monitors whether the replacement time is reached. Accordingly, even if one of the printers 103 is subjected to maintenance, the supervisor and users of the clients 102 can know which of the printers 103 will output their own jobs.

FIG. 13C is a diagram showing the result of rescheduling at a time point where maintenance is completed. At a time point shown by the arrow (2) in FIG. 13C, the server 101 performs scheduling that reassigns unprocessed print jobs to the printers 103 that include the printer 103a. In this way, print jobs are assigned to the printer 103a that has been restored to working order.

At the time point indicated by the arrow (2) when maintenance is completed, the printer 103c is carrying out the job JOB004 and the jobs JOB006, JOB007, JOB008, JOB009, and JOB010 remain as the unprocessed jobs for which image formation has yet to be carried out by any of the printers 103. Scheduling is performed in the order of reception for the print jobs so that JOB006 and JOB007 are assigned respectively to the printers 103a and 103b. In addition, the job JOB008 is assigned to the printer 103c that is the first to complete a print job, the job JOB009 is assigned to the printer 103b, and the job JOB010 is assigned to the printer 103a. As a result, the job schedule becomes as shown in FIG. 13C.

In this way, by scheduling jobs, it is possible to assign print jobs to the printer 103a that has been restored to working order so that the operation efficiency of print jobs can be increased. In addition, the supervisor and users of the clients 102 can know which of the printers 103 will output the print jobs issued by that client.

Figure 14:
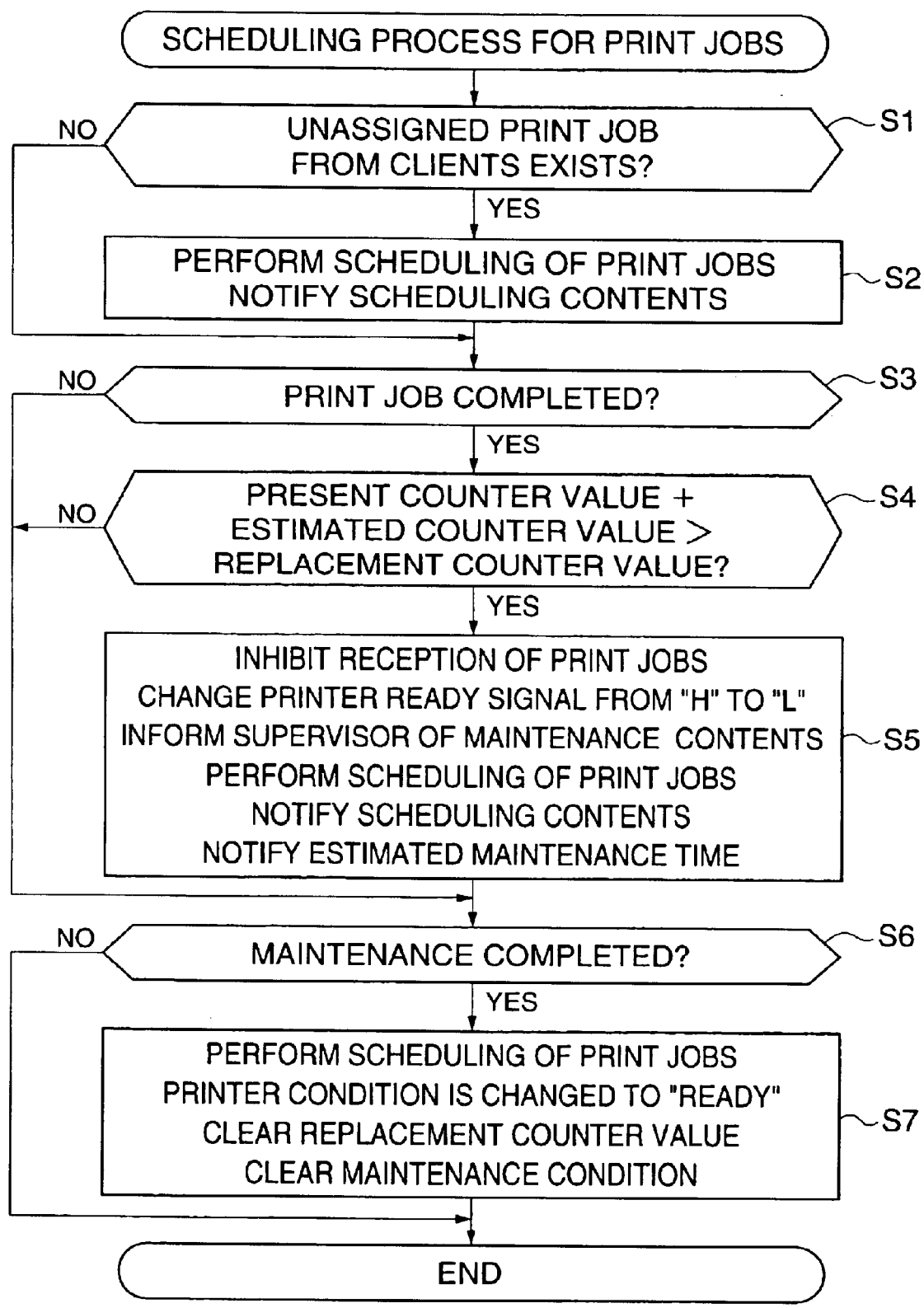
FIG. 14 is a flowchart showing the procedure of a scheduling process for print jobs that is carried out by the server 101.

FIG. 14 is a flowchart showing the procedure of the scheduling process of print jobs that is carried out by the server 101. A scheduling program for this procedure is stored in a storage medium inside the server 101 and is executed by a CPU inside the server 101. The server 101 also monitors the conditions of the printers 103 through communication via the network 105 of the respective printer ready signals of the printers 103 by executing other routines stored in the storage medium. For example, in the case when a jam has occurred, that is, when a recording sheet has become stuck on a route taken by sheets inside the printer 103a, the printer ready signal of the printer 103a is set to the "L" level. Accordingly, the server 101 needs to constantly monitor the respective conditions of the printers 103. Monitoring for an addition of a new printer and for the case where maintenance is completed for the printers 103 and the printers are restored to working order is also carried out by such routines. Such control is not shown.

Next, the procedure shown in FIG. 14 will be described. First, it is determined whether any undistributed print jobs have been provided from the clients 102 (step S1). When no print jobs have been provided, the process proceeds to a step S3, while when one or more print jobs have been provided, the server 101 performs scheduling for the print jobs to assign the print jobs to the respective printers 103 (step S2). As a result of the scheduling, print jobs are assigned as shown in FIG. 13A. In addition, in the step S2, the supervisor who uses the client 102a and the users of the other clients 102 are informed of the contents of the scheduling.

When a print job is completed and the next print job is carried out, it is necessary to determine whether the printers 103 include a printer for which the sum of the present counter value of the job completing printer and the estimated counter value related to the job to be carried out exceeds the corresponding replacement counter value.

To perform this determination, first, the server 101 determines whether any of the respective printers 103 has completed a print job (step S3). When it is determined that none of the printers 103 has completed a print job, the process proceeds to a step S6.

On the other hand, if it has been determined in the step S3 that at least one printer job has been completed by the printers 103, the server 101 determines for the printer in question (hereinafter referred to as the "job completing printer") whether the sum of the present counter value of the job completing printer and the estimated counter value related to a scheduled job to be carried out next exceeds the corresponding replacement counter value (step S4), and when none of the replacement counter values is exceeded ("NO" to the step S4), the process proceeds to the step S6. On the other hand, when one of the replacement counter values is exceeded ("YES" to the step S4), the server 101 determines that maintenance will soon commence for the job completing printer, so that even if the job completing printer receives a print job, such job will not be carried out for some time due to the maintenance, and accordingly the server 101 instructs the job completing printer to change the printer ready signal to the "L" level (step S5). By doing so, the server 101 can inhibit the reception of print jobs by the job completing printer from the clients 102 in appropriate timing.

Also, in the step S5, since the replacement counter value for the second feed roller will be exceeded when the job completing printer performs an image formation operation for the next print job, to inform the supervisor and urge the supervisor to perform maintenance on the second feed roller, the server 101 sends necessary information via the network 105 to the supervisor who uses the client 102a. In addition, the server 101 informs the supervisor of the client 102a and the users of the other clients 102 of the estimated time required for the maintenance.

In addition, in the step S5, since the reception of print jobs by the job completing printer from the clients 102 is inhibited, the print jobs are rescheduled for the printers 103 other than the job completing printer. As a result of this rescheduling, print jobs are assigned as shown in FIG. 13B. The server 101 informs the supervisor who uses the client 102a and the users of the other clients 102 of the result of the rescheduling. The supervisor and users of the clients 102 can therefore confirm which of the printers 103 will output the print jobs they have issued.

Next, it is determined whether the job completing printer is "under maintenance" (step S6). When the job completing printer is "under maintenance", the process quits the procedure in FIG. 14 and a rescheduling process for print jobs shown in FIG. 15, described later, is executed. On the other hand, when the maintenance has been completed, the process proceeds to a step S7.

Due to the server 101 performing control as shown in FIG. 14 described above, the supervisor starts the maintenance of the job completing printer for which the sum of the counter value and the estimated counter value related to the job to be carried out exceeds the corresponding replacement counter value, so that it is possible to prevent the job completing printer from becoming out of operation due to maintenance performed during the output of a print job. In addition, the server operates so as not to assign any print jobs to the job completing printer until after the maintenance has been completed and the job completing printer is restored to working order.

When the server 101 is informed via the network 105 that maintenance has been completed by the supervisor, the present counter value for the replaced component is cleared in the job completing printer and the job completing printer is restored from the "under maintenance" condition (step S7). In addition, in the step S7, rescheduling of unprocessed print jobs is performed for the printers 103 that include the restored job completing printer. As a result, the print jobs are scheduled as shown in FIG. 13C.

Also, when the maintenance has been completed for the job completing printer, the supervisor turns on the power of the job completing printer. After this, when it has been determined by both the self-diagnosis of the job completing printer described above and the sample image check by the supervisor that the image formation preparations have been completed successfully, the printer ready signal of the job completing printer is changed to the "H" level and the changed printer ready signal is outputted via the network 105 to the server 101. On the other hand, on receiving this printer ready signal, the server 101 detects that the job completing printer that was out of operation has been restored to working order.

The same effect can be achieved by modifying the above embodiment as described below. For example, the maintenance performed when the printer is out of operation due to a jam or running out of recording sheets does not affect images, and therefore, it is sufficient to confirm that recording sheets can be fed or conveyed. Accordingly, it is possible to modify the procedure so that in the case of maintenance that does not affect images, the maintenance can be completed by having just the job completing printer perform a self-diagnosis. By doing so, the time required to output the sample image can be saved, so that the supervisor can spare time more effectively.

Further, only in the case of maintenance that may affect images, instead of the job completing printer performing a self-diagnosis, the supervisor may carry out a test print when the maintenance is completed and judge whether print outputs can be performed correctly. If this is the case, the supervisor may then press a maintenance completion switch provided on an operating section of the job completing printer. As a result, the printer ready signal of the job completing printer transmitted via the network 105 to the server 101 can be changed to the "H" level, thereby indicating that the job completing printer has been restored to working order.

Figure 15:
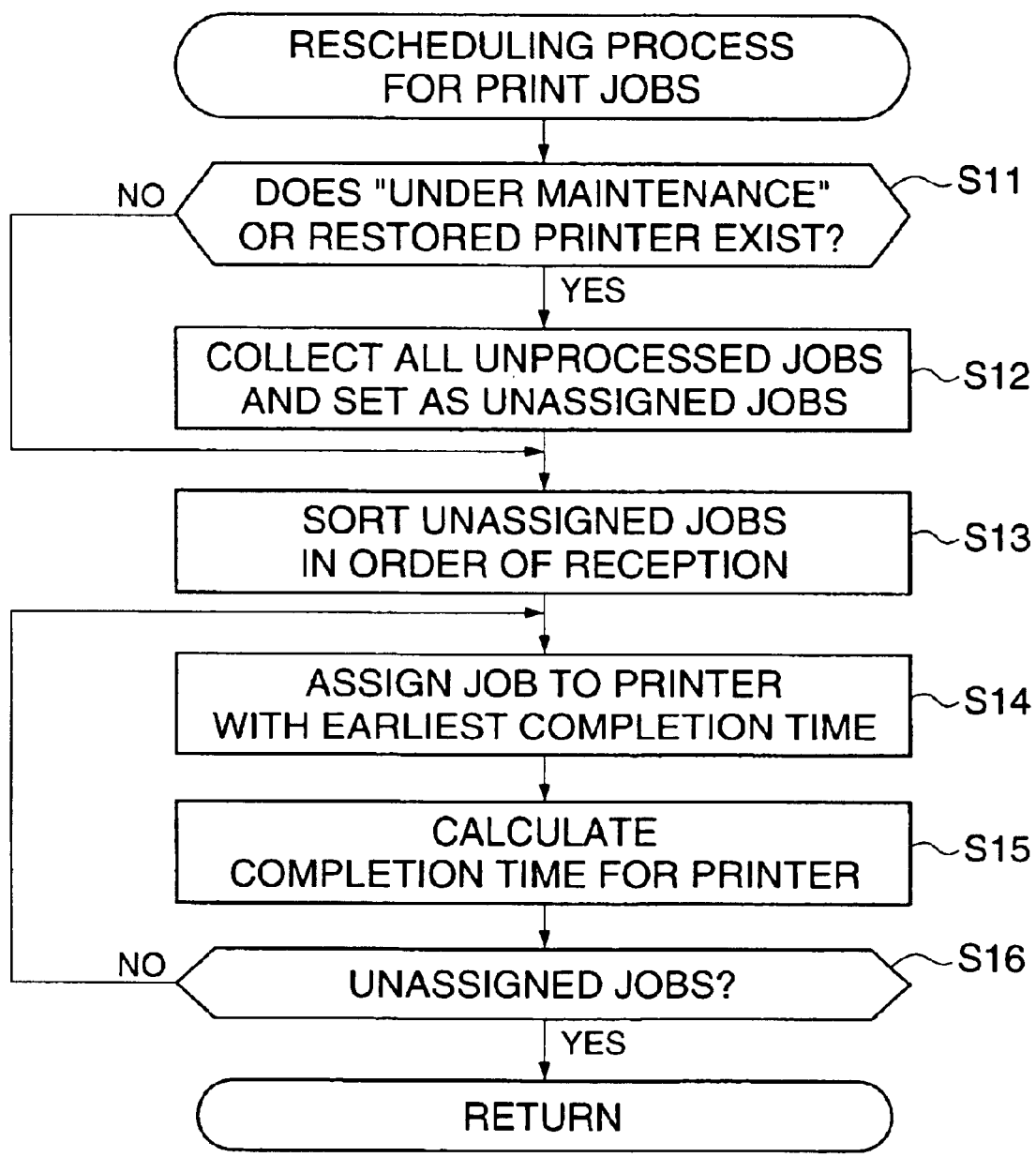
FIG. 15 is a flowchart showing the procedure of a rescheduling process for print jobs that is carried out by the server 101.

FIG. 15 is a flowchart showing the procedure of a rescheduling process for print jobs that is carried out by the server 101. As described above, this rescheduling process is carried out in the case where the server 101 has received a new print job ("YES" to the step S2), the case where the job completing printer is out of operation due to maintenance or the like (step S5), or the case where the job completing printer has been restored to working order (step S7).

In FIG. 15, first, it is determined whether there is a job completing printer that is now out of operation due to maintenance or the like or a job completing printer that has been restored (step S11). Specifically, in the present processing, when the server 101 has detected a change in the printer ready signal of any of the printers 103, such as when the printer ready signal has been changed to the "L" level or to the "H" level, the server 101 determines that there is a job completing printer that is now out of operation due to maintenance or the like or a job completing printer that has just been restored to working order.

When it is determined that there is a job completing printer that is out of operation or has just been restored ("YES" to the step S11), the server 101 collects all of the unprocessed print jobs from all of the printers 103 including the job completing printer and any print jobs that are yet to be assigned and sets all of the collected print jobs as "unassigned jobs" (step S12). This makes it possible to reassign the unprocessed print jobs that were assigned to the job completing printer that is now out of operation to any of the printers 103 that are in operation. On the other hand, when it is determined that there is no job completing printer that has become out of operation or has just been restored ("NO" to the step S11), that is, when there has been no change in the levels of the respective printer ready signals from the printers 103, the process proceeds directly to a step S13.

After this, the unassigned print jobs are sorted in order of time at which the jobs were received (step S13). In addition, the print job that was received first is assigned to a printer, out of the printers 103 that are presently operating, with the earliest completion time for a present print job (step S14). That is, when all of the printers 103 are carrying out print jobs and there is a printer that has just been restored to working order, an unassigned print job with the earliest reception time is assigned to the restored printer whose completion time is the present time. If this is not the case, the unassigned print job with the earliest reception time is assigned to the printer 103 whose completion time is closest to the present time. At this time, the server 101 informs the clients 102 of the printer, out of the printers 103, to which the unassigned print job has been assigned.

The server 101 calculates an estimated completion time at which the printer assigned the print job in the step S14 will complete the print job and updates the content of a memory that stores the completion time of that printer (step S15). Then, it is determined whether there are any other unassigned print jobs (step S16). When there is an unassigned print job, the process returns to the step S14, while when there is no unassigned print job, the process is terminated. That is, so long as there are still unassigned print jobs that have not been assigned to any of the printers 103, the processing in the steps S14 to S16 is repeated.

According to the present embodiment, as described above, when the printers 103 connected to the network 105 perform image forming operations for print jobs successively generated by the users of the clients 102, even if maintenance, such as the replacement of a component, becomes necessary for one of the printers 103 so that the printer becomes out of operation, the server 101 reschedules the print jobs so that image formation operations can be performed in the order in which the print jobs were inputted by the users of the clients 102, or in an order close to that order. The server 101 can inform the supervisor in advance of the contents of the maintenance, so that the supervisor can prepare for the maintenance in advance. Moreover, the server 101 informs the clients 102 of the printer, out of the printers 103, to which the unassigned print job has been assigned in the step S14, and therefore, the respective users of the clients 102 can check which of the printers 103 will output their own print jobs. Further, even after maintenance has been completed for one of the printers 103 so that the printer has been restored to working order, the server 101 reschedules the print jobs so that the operational efficiency of the image forming system can be increased.

The present invention is not limited to the above described embodiment and can be applied to any construction that can achieve the functions described in the appended claims or the functions of the construction of the above described embodiment.

For example, although in the above embodiment, scheduling is performed before maintenance of one printer is started and then after the maintenance is completed, the present invention can be applied in the same way to the case where following the start of maintenance of a first printer, maintenance is then started for a second and/or subsequent printer. In this case, before the maintenance starts on the second and/or subsequent printers, rescheduling is performed to assign the unassigned jobs to a printer or printers other than the printers that are being subjected to maintenance. After the maintenance has been completed, rescheduling is performed to assign the unassigned jobs to printers including the printer(s) for which the maintenance has been completed. In this way, the scheduling of jobs can be actively changed in accordance with maintenance performed on the printers.

For the present invention, the expression "maintenance" is interpreted in its widest meaning and is, therefore, not limited to the replacement of consumable parts. The expression "maintenance" is also used to refer to adjustments, cleaning, and refilling. Printing density adjustments and registration roller adjustments are examples of such adjustments. Cleaning of the platen glass and cleaning of a conveyor belt are examples of the cleaning. Replacement of a cleaning blade and replacement of an electrostatic charger are examples of the replacement of consumable parts that can be replaced. The refilling may include refilling of a printer with toner or recording sheets, for example.

Although there is no mention of the types of print jobs in the above embodiment, in the case of a system in which printers 104 are set up aside from the printers 103 shown in FIG. 1 with the printers 103 being color printers and the printers 104 being black-and-white printers, when, for example, one of the printers 103 reaches a replacement time during the execution of a color print job so that maintenance is performed, control may be provided such that the unprocessed color print jobs of the printers 103 are collected and rescheduling is performed to assign the collected color print jobs to the remaining printers 103, which makes it possible to prevent color print jobs from being assigned to the printers 104, i.e., to the black-and-white printers. Here, it goes without saying that there is no particular problem with scheduling being performed to assign black-and-white jobs to the printers 103.

Further, even in the above construction in which both color printers 103 and the black-and-white printers 104 are set up, when any of the printers 103 is under maintenance, scheduling may be within the printers 104 to assign print jobs to the printers 104 in the same way as in the above described embodiment, whereby image formation operations can be performed in the order in which the print jobs were inputted, or in an order close to that order.

It is to be understood that the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself-read out from the storage medium realizes the novel functions of the embodiment described above, and hence the storage medium in which the program code is stored constitutes the present invention.

Examples of the storage medium for supplying the program code include a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, a ROM, and an EEPROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the medium, such as a storage medium, into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A print managing apparatus that assigns a plurality of jobs to a plurality of printers, comprising:

a job receiving device that receives a plurality of jobs from at least one client;

a job assigning device that assigns the plurality of jobs received by said job receiving device to respective ones of the plurality of printers on a job-by-job basis; and a printer identifying device that identifies at least one specific printer of the plurality of printers that is to be brought into a condition where at least one print job assigned thereto cannot be carried out, wherein said job assigning device reassigns the unprocessed jobs of the plurality of jobs which have been assigned to the plurality of printers, including the at least one specific printer, to the plurality of printers other than the at least one specific printer, when said printer identifying device identifies the at least one specific printer, while the plurality of printers are carrying out the respective assigned print jobs.

2. A print managing apparatus as claimed in claim 1, wherein said job assigning device reassigns the unprocessed jobs in a manner such that the plurality of jobs received by said job received device are completed in the order of reception of the received plurality of jobs.

3. A print managing apparatus as claimed in claim 1, comprising a notifying device that notifies the client of results of reassignment by said job assigning device.

4. A print managing apparatus as claimed in claim 1, wherein said printer identifying device identifies as the at least one specific printer at least one printer that is to reach timing in which maintenance thereof is to be carried out while a print job assigned thereto is being carried out.

5. A print managing apparatus as claimed in claim 4, wherein the maintenance includes at least one of the following: replacement of a consumable part, adjustment of an operating condition of the printer, and cleaning of a component part of the printer.

6. A print managing apparatus as claimed in claim 4, wherein said printer identifying device identifies as the at least one specific printer the at least one printer that is to reach timing in which maintenance thereof is to be carried out, based on a number of printing operations found from the print job assigned thereto and an accumulated number of printing operations carried out by the printer.

7. A print managing apparatus as claimed in claim 1, wherein said job assigning device reassigns again the unprocessed jobs of the plurality of jobs which have been reassigned, to the plurality of printers, including the at least one specific printer, when said printer identifying device identifies that the at least one specific printer has been restored into a condition where the at least one specific printer can carry out printing.

8. A method of controlling a print managing apparatus that assigns a plurality of jobs to a plurality of printers, comprising:

a job receiving step of receiving a plurality of jobs from at least one client;

a job assigning step of assigning the plurality of jobs received in said job receiving step to respective ones of the plurality of printers on a job-by-job basis; and a printer identifying step of identifying at least one specific printer of the plurality of printers that is to be brought into a condition where at least one print job assigned thereto cannot be carried Out, wherein in said job assigning step, the unprocessed jobs of the plurality of jobs which have been assigned to the plurality of printers, including the at least one specific printer, are reassigned to the plurality of printers other than the at least one specific printer, when in said printer identifying step the at least one specific printer is identified, while the plurality of printers are carrying out the respective assigned print jobs.

9. A method as claimed in claim 8, wherein in said job assigning step, the unprocessed jobs are reassigned in a manner such that the plurality of jobs received in said job received step are completed in the order of reception of the received plurality of jobs.

10. A method as claimed in claim 8, comprising a notifying step of notifying the client of results of reassignment in said job assigning step.

11. A method as claimed in claim 8, wherein in said printer identifying step, at least one printer that is to reach timing in which maintenance thereof is to be carried out while a print job assigned thereto is being carried out is identified as the at least one specific printer.

12. A method as claimed in claim 11, wherein the maintenance includes at least one of the following: replacement of a consumable part, adjustment of an operating condition of the printer, and cleaning of a component part of the printer.

13. A method as claimed in claim 11, wherein in said printer identifying step, the at least one printer that is to reach timing in which maintenance thereof is to be carried out is identified as the at least one specific printer based on a number of printing operations found from the print job assigned thereto and an accumulated number of printing operations carried out by the printer.

14. A method as claimed in claim 8, further comprising:
a second printer identifying step of identifying whether the at least one specific printer has been restored into a condition where the at least one specific printer can carry out printing; and
a second job assigning step of reassigning again the unprocessed jobs of the plurality of jobs which have been reassigned, to the plurality of printers, including the at least one specific printer, when in said second printer identifying step it is identified that the at least one specific printer has been restored into the condition where the at least one specific printer can carry out printing.

15. A computer-executable program for causing a print managing apparatus that assigns a plurality of jobs to a plurality of printers to execute a control method comprising:
a job receiving step of receiving a plurality of jobs from at least one client;
a job assigning step of assigning the plurality of jobs received in said job receiving step to respective ones of the plurality of printers on a job-by-job basis; and
a printer identifying step of identifying at least one specific printer of the plurality of printers that is to be brought into a condition where at least one print job assigned thereto cannot be carried out,
wherein in said job assigning step, the unprocessed jobs of the plurality of jobs which have been assigned to the plurality of printers, including the at least one specific printer, are reassigned to the plurality of printers other than the at least one specific printer, when in said printer identifying step the at least one specific printer is identified, while the plurality of printers are carrying out the respective assigned print jobs.

* * * * *